OVERLOAD PROTECTION FOR THERMALLY SENSITIVE LOAD DEVICE

Filed Feb. 27, 1967 2 Sheets-Sheet 1

INVENTORS
GEORGE A. CAVIGELLI
JOHN G. NORDAHL
BY Arnold, Roylance, Kruger & Durkee
ATTORNEYS

OVERLOAD PROTECTION FOR THERMALLY SENSITIVE LOAD DEVICE

Filed Feb. 27, 1967 2 Sheets-Sheet 2

INVENTORS
GEORGE A. CAVIGELLI
JOHN G. NORDAHL
BY Arnold, Roylance, Kruger & Durkee
ATTORNEYS United States Patent Office 3,488,573

Patented Jan. 6, 1970

3,488,573
OVERLOAD PROTECTION FOR THERMALLY SENSITIVE LOAD DEVICE

George A. Cavigelli, Belmont, and John G. Nordahl, Lexington, Mass., assignors to Weston Instruments, Inc., Newark, N.J., a corporation of Delaware Filed Feb. 27, 1967, Ser. No. 618,607
Int. Cl. H02m *1/18*
U.S. Cl. 321—1.5 9 Claims

ABSTRACT OF THE DISCLOSURE

An input circuit, including two series-connected resistors or amplifiers, delivers an input current to the first thermoelement of a thermal converter. To prevent overheating damage to the thermoelement, two diodes are connected in parallel, oppositely poled, between an intermediate point in the input circuit and a control circuit. The control circuit compares the input signal level with a signal derived from the thermal converter, the derived signal being representative of thermoelement temperature. When the temperature reaches a preselected level, the control circuit renders the diodes conductive and shunts at least part of the input signal to ground. The control circuit includes a common emitter pair circuit controlling two transistors which in turn control the conductivity of the diodes. The diodes are typically of the conventional asymmetrically conductive type, though diodes of the threshold or breakdown type can also be used.

This invention relates to apparatus for variably limiting the amplitude of electrical signals provided to a thermally sensitive load device to protect the device.

In U.S. patent application Ser. No. 522,733, filed Jan. 24, 1966, by Peter L. Richman, now Patent No. 3,435,319 and entitled RMS Converters, there are disclosed various embodiments of thermal converters which, in broad terms, perform the function of converting an input waveform to a DC output linearly proportional to the RMS value of the input waveform. As described therein, RMS converters utilize thermally sensitive elements, known in the art as thermoelements, this term including the broad class of devices exhibiting electrical characteristics that vary with temperature. Temperature-varying electrical characteristics can include a change in one or more of the electrical properties of a device such as resistance, capacitance, inductance, semi-conductance and the like; the generation of an electrical voltage or current; and ancillary effects, such as a field effect, capable of detection by external sensors.

In the above mentioned Richman application, the devices disclosed include heating elements which aid in the conversion of electricity to heat which is followed by a conversion back to electricity. In any such apparatus, some conversion of electricity to heat is a part of the operation of the apparatus, this conversion generally involving some kind of element which is quite sensitive to temperature and which can be destroyed or at least seriously damaged by excessive temperatures.

One of the major advantages of RMS converters in general, including especially those described in the aforementioned application, is the fact that such converters respond to almost any input waveform to produce a signal which is proportional to the RMS (root-mean-square) value of that input waveform. Thus, for example, the RMS value of an input signal which is triangular or which consists of spaced pulses can be measured as well as one which is sinusoidal.

However, because of the temperature sensitivity of the thermoelements used in these converters, it is possible that a waveform applied to the thermal converter can have power characteristics such as to cause damage to the thermoelement. Any general purpose RMS measuring system must be capable of handling irregular waveshapes which can include repetitive peaks of short duration and great amplitude. For example, a pulse train consisting of 7 volt pulses at a duty cycle of 1 to 49 has an RMS value of 1 volt. The thermoelement of a prior art converter designed to measure 1 volt RMS full scale would be subjected to a heating power equal to $7^2/2=24.5$ times full scale heating if the duty cycle of this 7 volt pulse train applied to its input terminals suddenly shifted to a duty cycle of 2 to 1. This extreme current would rapidly damage and probably destroy the thermoelement.

This danger could be prevented by employing so-called "hard" limiting, i.e., by connecting a breakdown device or other shunting means to the converter input. However, to be adequately protective, the shunting device would necesarily clip all signals at amplitudes barely above the design full-scale level of the converter. This would prevent measurement of many signals which are not of a type to cause damage but which should be measured. The accuracy of the converter would thus be seriously impaired and the purpose defeated.

An object of the present invention is to provide apparatus for protecting thermally sensitive load devices from electrical input signals of excessive amplitude.

Another object is to provide means for limiting the amplitude of signals applied to the thermoelements of a thermal converter to prevent damage to the thermoelements.

A further object is to provide an apparatus responsive to the heating of a thermoelement in a thermal converter to limit the amplitude of electrical input signals supplied to the thermoelement when the heating effect exceeds a predetermined level.

Yet another object is to provide controlled signal shunting apparatus to protect a thermoelement from damage due to overheating.

In order that the manner in which the foregoing and other objects are attained in accordance with the invention can be understood in detail, particularly advantageous embodiments thereof will be described with reference to the accompanying drawings, which form a part of this specification, and wherein.

Apparatus according to the invention includes controllable switch means connected to variably limit the amplitude of electrical signals passing through input circuit means to a thermally sensitive load such as a thermal converter. The switch means is controlled by control circuit means which responds to the input signal level and to a signal derived from the thermally sensitive load to shunt at least a portion of the input signal when the temperature of a preselected portion of the load approaches a predetermined level. Means are provided for deriving an electrical signal proportional to the temperature of the load portion.

Figure 1:
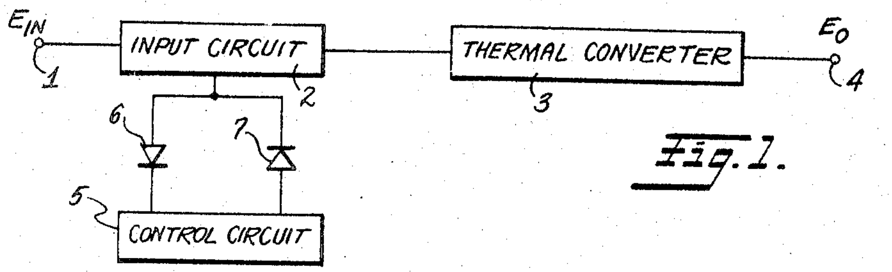
FIG. 1 is a block diagram of an apparatus in accordance with the broader aspects of the invention.

Referring now to FIG. 1, it will be seen that in this embodiment of the invention an input $E_{in}$ is applied to an input terminal 1 which is connected to an input circuit 2. Input circuit 2 can take several different forms, the function of the input circuit being to couple the input electrical signal to the load device with appropriate impedance relationships and to convert the input voltage into a proportional input current where the load is a thermal converter of the type which requires that the input signal be in the form of a driving current. The output of circuit 2 is connected to the input of a thermal converter circuit 3. Converter 3 can also take many forms, several of these having been described in the aforementioned Richman application, although the present invention is not necessarily limited to the particular embodiments disclosed therein. The output of converter circuit 3 is an output voltage $E_o$ which appears at an output terminal 4.

As described above, the primary function of a thermal converter in the general class under discussion is to accept an input waveform and to provide an output voltage, usually DC, which is directly and linearly proportional to the RMS value of the input waveform. The result of this conversion is the output voltage $E_o$.

In addition, the converter circuit is of a type which generates an internal correction voltage the primary function of which is to linearize the operation of the otherwise imperfect thermoelements, but which in addition is representative of the thermal condition of the input thermoelement of the circuit. This voltage is used in the present invention to control the operation of a limiting apparatus connected to the input circuit. The correction signal from converter circuit 3 is connected to the input of a control circuit 5 which responds to the amplitude of the correction signal to bias first and second semiconductor diodes identified in FIG. 1 as diodes 6 and 7. The cathode of diode 7 and anode of diode 6 are connected to an intermediate point in input circuit 2, the anode of diode 7 and the cathode of diode 6 being connected to the control circuit 5. As will be recognized by those skilled in the art, if an AC voltage waveform exists at the point in input circuit 2 to which the diodes are connected and if the control circuit connections of diodes 6 and 7 rest at ground potential, the waveform in input circuit 2 will be clipped just above ground level symmetrically, the positive portion of the waveform being clipped by one diode and the negative portion of the waveform by the other. The clipping voltage level is that required to overcome initial breakdown level of the diodes, on the order of .5 volt. If the control circuit provides to diodes 6 and 7 bias voltages which are greater than zero in absolute magnitude and of appropriate polarity, the waveform in input circuit 2 will be clipped substantially at the bias voltage level, and will still be clipped symmetrically. The manner in which the bias voltage is provided will be described in greater detail below.

Figure 2:
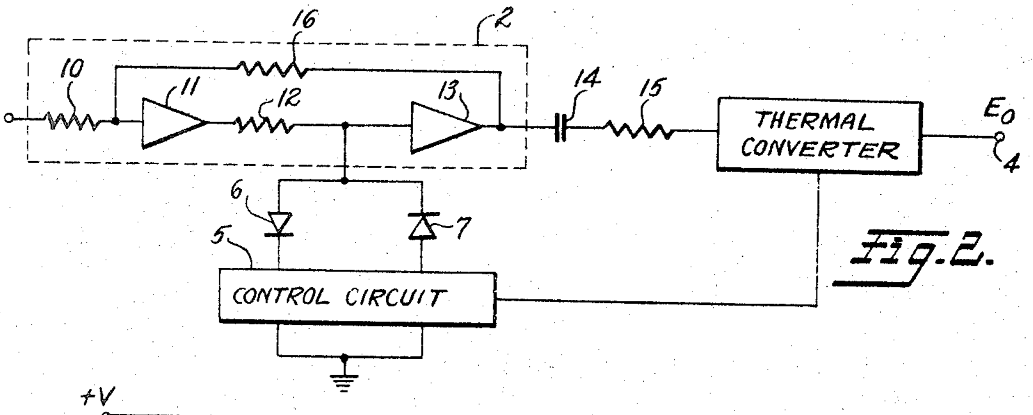
FIG. 2 is a schematic diagram of an apparatus in accordance with the invention and showing one particular input circuit usable therein.

In FIG. 2, a particular input circuit 2 is shown connected to the thermal converter, control circuit and diodes as in FIG. 1, the input circuit including an input resistance 10 which is connected between input terminal 1 and the input terminal of an amplifier 11. A resistor 12 is connected between the output terminal of amplifier 11 and the input terminal of an amplifier 13, diodes 6 and 7 also being connected to the input of amplifier 13. The output of amplifier 13 is coupled into thermal converter 3 by a capacitor 14 and an input resistor 15. A feedback resistor 16 is connected across both amplifiers from the output terminal of amplifier 13 to the input terminal of amplifier 11, resulting in operation which is equivalent to that of a precision or operational amplifier having a gain which is determined by the ratio of the values of resistors 16 and 10. The output of input circuit 2 is therefore a current proportional to the input voltage applied at terminal 1. As discussed with reference to FIG. 1, the waveform appearing at the input to amplifier 13 is limited by the action of diodes 6 and 7 when the bias voltages supplied by control circuit 5 are less than the peak voltages appearing at the input to amplifier 13. The manner in which a conductive path is provided by control circuit 5 between the diodes and a ground will be discussed more fully with reference to FIG. 5.

Figure 3:
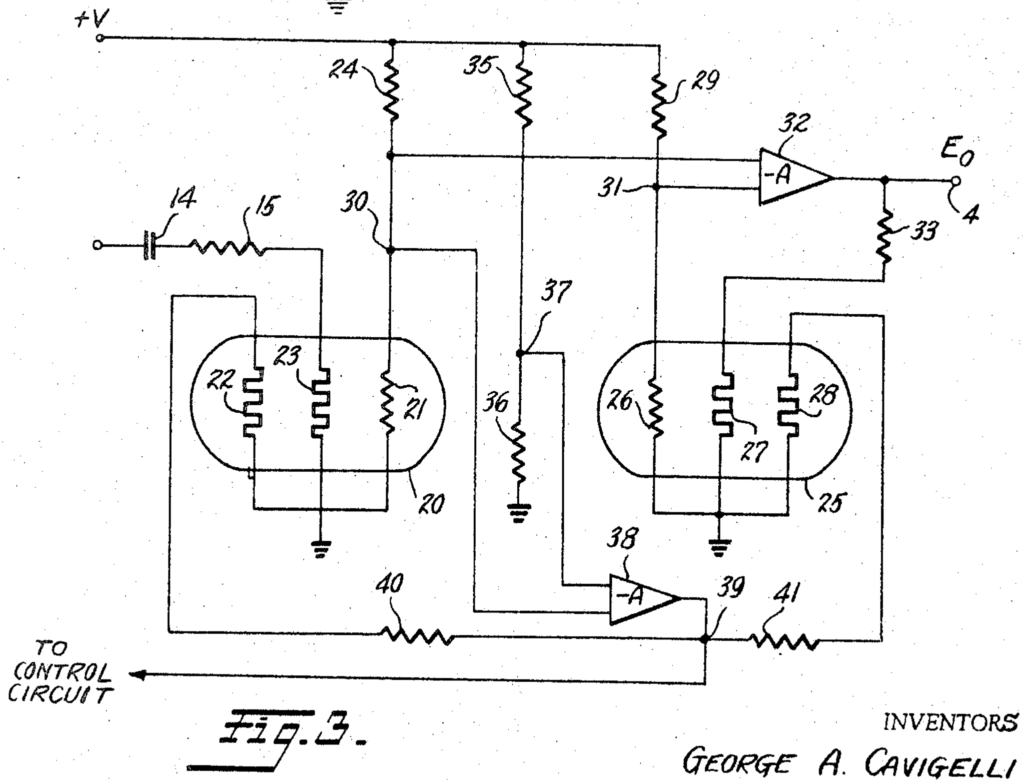
FIG. 3 is a schematic diagram of one form of thermal converter usable in the apparatus of FIGS. 1 and 2.

FIG. 3 shows a schematic diagram of a thermal converter of a type usable as converter 3 in either FIG. 1 or FIG. 2. The circuit of FIG. 3 is fully described in the previously-mentioned Richman application and need only be described briefly here. The converter of FIG. 3 includes thermoelements 20 and 25 which comprise thermistors 21 and 26 and heater elements 22, 23, 27 and 28. Thermistors 21 and 26 are connected in a bridge circuit with resistors 24 and 29 between a source of positive DC voltage and ground. Each thermistor is connected in a separate leg of the resistance bridge circuit, resistors 24 and 29 being temperature-insensitive resistors. Any unbalance in the bridge due to differences in resistance of thermistors 21 and 26 appears across the corners of the bridge at junctions 30 and 31. Junctions 30 and 31 are connected to the input terminals of a conventional DC amplifier 32, the output of which is $E_o$ and appears at terminal 4. The output of amplifier 32 is also connected, through a fixed resistor 33, to heater element 27 of thermoelement 25. Resistor 33 decreases the voltage from the output of high gain amplifier 32 to a level which allows the output circuit to heat thermistor 26, the output voltage $E_o$ being a directly proportional function of the RMS value of the input waveform.

However, it is very difficult to obtain perfectly matched thermistors in practice, and unmatched thermistors give rise to serious non-linearities in such a system. An auxiliary bridge is therefore established using thermistor 21 and resistor 24 as one leg and a divider circuit including fixed resistors 35 and 36, connected in series circuit relationship between the positive voltage supply and ground, as the other leg. The error signal for this bridge appears between junctions 30 and 37, this error voltage being connected to the input terminals of high gain DC operation amplifier 38 which compares the voltage at junction 30 with the reference voltage at junction 37 obtained by the divider circuit. The output of amplifier 38 is connected at a junction 39 to fixed resistors 40 and 41. Resistors 40 and 41 are connected to the auxiliary heaters 22 and 28 in thermoelements 20 and 25. The signal produced by amplifier 38 is used to generate sufficient heat in thermoelements 20 and 25 to drive the thermistors back to their original operating points, thereby providing isothermal operation and avoiding the difficulties inherent in attempting to find two thermistors the characteristics of which will track over a substantial range of temperature variation.

It will be apparent that the voltage difference between junctions 30 and 37 is a direct function of the heating, i.e., the temperature, of thermistor 21 which is, in turn, a function of the power applied to the input heater 23. It is heater 23 and its thermally coupled associated elements which must be protected from excessive peak voltages. It will be further evident that the output voltage of amplifier 38 appearing at junction 39 will likewise be a function of the thermistor temperature and therefore of the power input, and it is this voltage which is connected back to control circuit 5. The input voltage to the control circuit is therefore a voltage signal representative of thermoelement temperature and can be used to control the input circuit limiting function.

Figure 4:
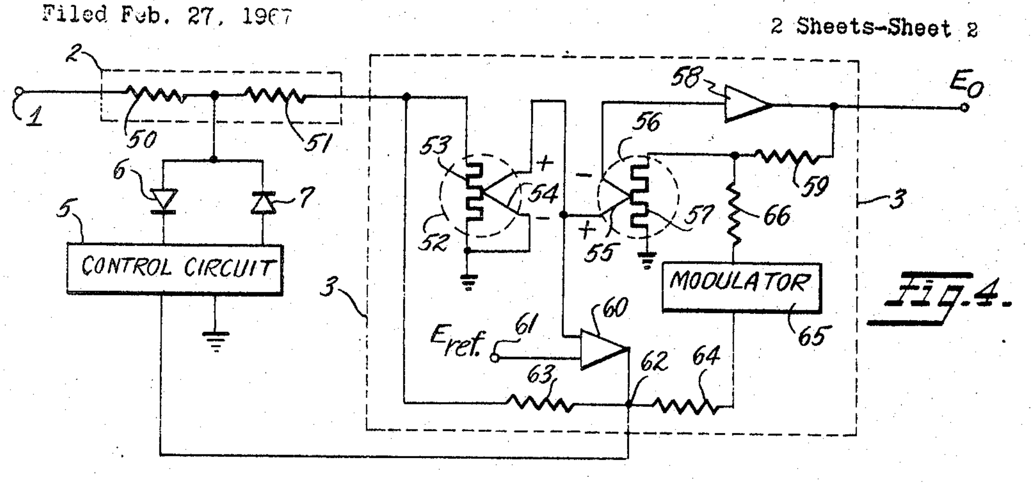
FIG. 4 is a schematic diagram showing in detail another form of thermal converter usable in the apparatus of this invention.

FIG. 4 shows a further embodiment of an apparatus in accordance with the invention, those portions of the system which are the same as in FIGS. 1–3 being identified by the same reference numerals. In FIG. 4, a different type of input circuit is shown, this circuit being usable in some particular situations in which the input amplifier system shown in FIG. 2 is not necessary. The input circuit 2 in FIG. 4 includes a fixed resistor 50 and a fixed resistor 51, resistors 50 and 51 being connected in series circuit relationship between input terminal 1 and the input of thermal converter circuit 3. The junction between resistors 50 and 51 is connected to the anode of diode 7 and the cathode of diode 6 in a manner similar to that described with reference to FIGS. 1 and 2.

FIG. 4 also shows in detail a thermal converter in which the thermoelements are indirectly heated thermocouples rather than thermistors. The thermal converter of FIG. 4 includes a thermoelement 52 which includes a heater element 53 thermally coupled to a bi-metal thermocouple junction 54. Heater element 53 is connected between input circuit 2 and ground and one terminal of a thermocouple 55 in a thermoelement 56. Thermocouple 55 is thermally coupled to a heater element 57. The other terminal of thermocouple 55 is connected to the input terminal of a DC amplifier 58, the output of which is the output voltage $E_0$. The output of amplifier 58 is coupled through a dropping resistor 59 to heater element 57.

The linearizing circuit for the thermal converter of FIG. 4 includes a high gain DC operational amplifier 60 the inputs to which are supplied from a reference voltage source connected to input terminal 61 and the output of thermoelement 52. These two inputs are summed into amplifier 60 which provides an output representative of the difference between the thermocouple output voltage and the arbitrary selected voltage $E_{ref}$. This reference voltage, as in the manner of the reference bridge voltage obtained at junction 37 in FIG. 3, is an arbitrarily selected voltage, but is advantageously on the same order of magnitude as the voltage produced by the thermoelement. The output of amplifier 60 is connected to a junction 62 which is connected to the input terminal of control circuit 5, this voltage being used to control the conductive states of diodes 6 and 7. The voltage appearing at junction 62 is coupled through a fixed resistor 63 to heater element 53 and through a fixed resistor 64, a modulator circuit 65, and a fixed resistor 66 to the heater 57 of thermoelement 56. Modulator 65 performs the function of converting the DC voltage at junction 62 into an AC voltage so that this can be appropriately added to the DC voltage output of amplifier 58 in an orthogonal relationship. The DC voltage coupled through resistor 63 is a DC voltage which similarly adds orthogonally with the AC voltage provided by the input circuit to the heater element 53 of thermoelement 52. It will be recognized that this particular embodiment is limited to use with an AC input voltage which has no significant DC component. The operation of the apparatus of FIG. 4 is basically similar to the thermistor circuit described with reference to FIG. 3 and need not be repeated here.

Figures 5, 6:
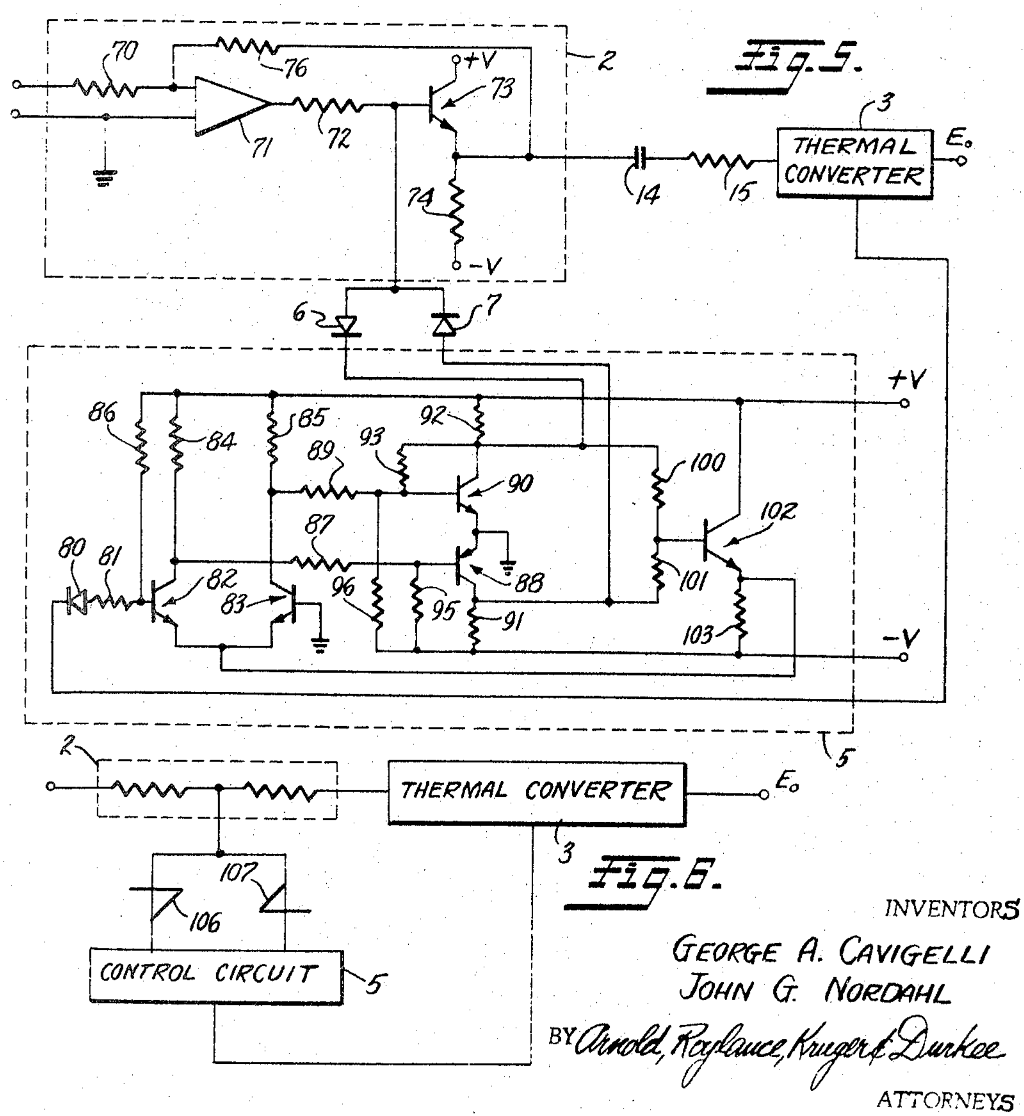
FIG. 5 is a schematic diagram of an apparatus in accordance with the invention showing in detail a comparator circuit usable therein.
FIG. 6 is a schematic diagram of a limiting circuit usable in the embodiments of FIG. 1, 2, 4 or 5.

In the embodiment of FIG. 5 is shown an input circuit of yet another type which includes a fixed resistor 70 connected between input terminal 1 and the input of an amplifier 71. A fixed resistor 72 is connected between the output of amplifier 71 and the base electrode of a conventional NPN transistor indicated generally at 73. The collector electrode of transistor 73 is connected to a positive DC supply and the emitter electrode of transistor 73 is connected through a fixed resistor 74 to a negative DC supply. The emitter electrode is also connected through coupling capacitor 14 and input resistor 15 to the input of thermal converter 3. The base electrode of transistor 73 is connected to the anode of diode 6 and the cathode of diode 7 as before. A feedback resistor 76 is connected from the emitter of transistor 73 to the input of amplifier 71, as discussed with reference to FIG. 2.

In this input circuit the development of an input current for the thermal converter is accomplished primarily by amplifier 71, transistor 73 acting as an impedance matching emitter-follower circuit for the thermal converter, and providing a point to which the limiting diodes can be attached.

In FIG. 5, a control circuit 5 usable in any of the embodiments of FIG. 1, FIG. 2, or FIG. 4 is shown in greater detail. In this circuit, the correction signal from thermal converter 3 is connected to the cathode of a semi-conductor diode 80, the anode of which is connected through a fixed resistor 81 to the base electrode of a conventional NPN transistor indicated generally at 82. Another conventional NPN transistor, indicated generally at 83, is connected with transistor 82 to form a common emitter pair circuit, the emitter of these two transistors being connected together and the collectors being connected through fixed resistors 84 and 85 to a positive DC source of supply. A fixed resistor 86 is connected between the positive DC source and the base electrode of transistor 82 to provide the proper bias for the base electrode. The control signal from thermal converter 3 acts on the base electrode of transistor 82, while the base of transistor 83 is connected to ground.

The collector electrode of transistor 82 is connected through a fixed resistor 87 to the base electrode of a conventional PNP transistor indicated generally at 88. The collector electrode of transistor 83 is similarly connected through a fixed resistor 89 to the base electrode of a conventional NPN transistor indicated generally at 90. The emitter electrodes of transistors 88 and 90 are connected to ground and the collector electrodes are connected through fixed resistors 91 and 92 to the negative and positive DC supply sources, respectively. Fixed resistors 93, 94, 95, and 96 are connected in these two transistor circuits in relatively conventional fashion to provide proper electrode biasing for the desired operation.

The collector electrodes of transistors 88 and 90 are also connected to diodes 7 and 6, transistor 88 being connected to control the conductive state of diode 7 and transistor 90 being connected to control the conductive state of diode 6.

The operation of the circuit discussed thus far can be summarized as follows. In the absence of a signal from thermal converter 3 to control circuit 5, transistor 82 is in a normally non-conductive condition and transistor 83 is normally in a conductive state. The collector voltage of transistor 82 is therefore positive, providing a positive potential at the base electrode of transistor 88, holding that transistor non-conductive. Conversely, the collector potential of transistor 83 is normally substantially more negative than the positive DC supply level, providing a negative potential at the base electrode of transistor 90, similarly holding that transistor in a non-conductive state. However, when the temperature of the thermoelement of thermal converter 3 becomes excessive due to excessive input power, a positive signal is supplied through diode 80 and resistor 81 to the base electrode of transistor 82, rendering that transistor conductive. Because of the current flow through the common emitter connections of transistors 82 and 83, the emitter of transistor 83 is driven more positive and transistor 83 is rendered less conductive. Thus the potential at the base electrode of transistor 88 is driven more negative and the potential at the base electrode of transistor 90 is driven more positive. Transistors 88 and 90 therefore begin to conduct a significant amount of current, lowering the voltage level at the collector electrodes of transistors 88 and 90. The cathode of diode 6 and the anode of diode 7 are therefore caused to approach ground potential from the negative and positive directions, respectively, so that whenever the voltage excursions of the waveform at the base electrode of transistor 73 exceeds the voltage levels at the collectors of transistors 88 and 90, diodes 6 and 7 are allowed to enter a conductive state, clipping or limiting the voltage applied through transistor 73 to the input of the thermal converter.

In a practical circuit of this type, with relatively high gain transistors in control circuit 5, the application of a relatively small positive voltage to the base electrode of transistor 83 causes the transistors in the common emitter pair to change state quite completely, driving transistors 88 and 90 into a highly conductive condition and causing the collector electrode potentials of these transistors to fall nearly to ground level. The waveform at the base of transistor 73 is then limited to substantially ground level, completely depriving thermal converter 3 of the input signal. This, however, is not a disadvantage because several cycles of the initial input waveform are necessary to raise the temperature of the input thermal element of the converter 3 to a level where the positive signal will be provided to control circuit 5. By the time this heating effect has occurred, the converter has developed an output voltage $E_0$ which is indicative of the full-scale RMS magnitude of the input waveform. Depriving the converter of an input signal therefore accomplishes the desired function (protection of the input thermoelement) without providing an erroneous output signal. After the time equivalent of several cycles of operation without an input signal, the input thermoelement temperature normally drops to a safe level, thereby removing the voltage at the input of control circuit 5 and allowing the transistors therein to return to their normal states, again placing the diodes in their blocking states and allowing the waveform to again be provided to the base electrode of transistor 73.

It will be noted that the waveform should be clipped or limited symmetrically on either side of ground, i.e., the positive portion of the waveform should be clipped at the same level above ground as the negative portion of the waveform is clipped below ground. To be sure that this symmetry exists, the collector electrodes of transistors 88 and 90 are connected through fixed resistors 100 and 101 to the base electrode of a conventional NPN transistor indicated generally at 102. The collector electrode of transistor 102 is connected to the positive DC supply and the emitter electrode is connected through a resistor 103 to the negative DC supply. The emitter electrodes of transistors 82 and 83 are connected to the emitter electrodes of transistor 102. It will be recognized that if the collector potentials of transistors 88 and 90 are separated from ground by voltages which are equal in absolute magnitude but are on opposite sides of ground the potential at the base electrode of transistor 102 will rest precisely at ground, resistors 100 and 101 being equal in value. The value of resistor 103 is selected so that, with the base electrode at ground potential, a small amount of current flows through the emitter-collector circuit of transistor 102 providing the desired bias at the emitter electrodes of transistors 82 and 83. However, should transistors 88 and 90 tend to conduct unsymmetrically, a correction current is supplied by transistor 102 to alter the conductivity of transistors 82 and 83 and to restore a symmetrical condition.

As previously mentioned, diodes 6 and 7 can be conventional asymmetrically conductive diodes, or can be breakdown devices selected from the several types presently available on the market. In FIG. 6, an example of diodes of this type is shown connected to a control circuit 5, a thermal converter 3 and an input circuit 2. In FIG. 6, a four-layer diode of the breakdown type, commonly known as a Shockley diode, is shown connected between an intermediate junction in input circuit 2 and control circuit 5. Two such diodes, identified as diodes 106 and 107, are shown connected with reverse polarity between the input circuit and the control circuit. As will be recognized by those skilled in the art, when diodes of this type are used the control circuit need not be of the type shown in FIG. 5 but can take a somewhat different form more appropriate to the particular breakdown or avalanche characteristic exhibited by these diodes. However, it will be seen that the same basic principles can apply, a signal from thermal converter 3 activating the control circuit to provide an appopiate bias to diodes 106 and 107 to symmetrically limit the waveform applied to the thermal converter.

While certain advantageous embodiments have been chosen to illustrate the invention, it will be understood by those skilled in the art that various changes and modifications can be made therein without departing from the scope of the invention.

What is claimed is:

1. An apparatus for protecting the input thermoelement of a thermal converter of the type having at least one thermoelement and circuit means for developing an electrical signal representative of the temperature of the thermoelement, the apparatus comprising the combination of input circuit means for providing an input current to the thermal converter; switching circuit means having a conductive state and a nonconductive state, said switching circuit means being connected to said input circuit means and to a point of reference potential, said switching circuit means being operative to diminish the amplitude of said input current when in said conductive state; control circuit means connected to said switching circuit means for controlling the input signal level at which said switching circuit means becomes conductive and diminishes the amplitude of said input current by shunting said input current to said point of reference potential; and circuit means for providing to said control circuit means the electrical signal representative of thermoelement temperature, said control circuit means being responsive to the representative electrical signal to render said switching circuit means conductive when said representative electrical signal reaches a preselected level.

2. An apparatus according to claim 1 wherein said input circuit means includes first and second amplifier circuit means connected in series circuit relationship, said switching circuit means being connected to said input circuit means between said first and second amplifiers.

3. An apparatus according to claim 1 wherein said input circuit means comprises first and second resistors connected in series circuit relationship, said switching circuit means being connected to said input circuit means between said first and second amplifiers.

4. Apparatus according to claim 1 wherein said switching circuit means comprises first and second electrical paths connected in parallel circuit relationship between said input circuit means and a point of reference potential, said first and second paths being capable of conducting current in opposite directions when in said conductive state.

5. An apparatus according to claim 4 wherein each of said first and second conductive paths includes a semiconductor diode, and a transistor having a base electrode, a collector electrode and an emitter electrode, said diode being connected in series circuit relationship with the emitter-collector circuit of said transistor between said input circuit means and said point of reference potential, said transistor being controllable to bias said diode to selectively conduct or block current flow.

6. An apparatus according to claim 5 wherein said control circuit means comprises third and fourth transistors connected in a common emitter pair circuit having two output terminals, one of said output terminals being connected to the base electrode of said transistor in one of said first and second paths, the other output terminal being connected to the base electrode of said transistor in the other one of said paths.

7. An apparatus according to claim 1 wherein said control circuit means comprises a pair of transistors connected in a common emitter pair circuit, each of said transistors having a base electrode, an emitter electrode and a collector electrode, said base electrode of one of said transistors being connected to said circuit means for providing the electrical signal representative of thermoelement temperature, said base electrode of the other of said transistors being connected to a point of reference potential, said collector electrodes of said transistors being connected to said switching circuit means to control the conductive state thereof.

8. An apparatus for protecting the input thermoelement of a thermal converter of the type having at least one thermoelement and circuit means for developing an electrical signal representative of the temperature of the thermoelement, the apparatus comprising the combination of input circuit means for providing an AC input current to the thermal converter, first and second asymmetrically conductive devices each having first and second terminals, each of said devices being characterized by a lower resistance to current flow from said first terminal to said second terminal than to current flow in the reverse direction, the first terminal of said first device and the second terminal of said second device being connected to an intermediate point in said input circuit means; control circuit means connected to the remaining terminals of said first and second devices to provide a biasing voltage thereto; circuit means for providing the electrical signal representative of thermoelement temperature to said control circuit means, said control circuit means being responsive to the amplitude of the electrical signal to bias said first and second devices to conduct current and to provide low impedance paths through said devices to a point of reference potential whenever the absolute value of electrical signals in said input circuit means exceeds a preselected value and to thereby limit the amplitude of signal current provided to the thermal converter.

9. An apparatus for protecting the input thermoelement of a thermal converter of the type having at least one thermoelement and circuit means for developing an electrical signal representative of the temperature of the thermoelement, the apparatus comprising the combination of input circuit means for providing an AC input current to the thermal converter, first and second semiconductor devices each having first and second terminals, each of said devices being characterized by a lower resistance to current flow from said first terminal to said second terminal than to current flow in the reverse direction, said devices being further characterized by a voltage threshold level between said first and second terminals below which the internal resistance between said terminals is relatively high and above which the internal resistance is very low, the first terminal of said first device and the second terminal of said second device being connected to an intermediate point in said input circuit means; control circuit means connected to said first and second devices to provide a biasing voltage thereto; circuit means for providing the electrical signal representative of thermoelement temperature to said control circuit means, said control circuit means being responsive to the amplitude of the electrical signal to bias said first and second devices to conduct current from said input circuit to a point of reference potential whenever the absolute value of electrical signals in said input circuit means exceeds a preselected value and to thereby limit the amplitude of signal current provided to the thermal converter by shunting a portion of said input current to said point of reference potential.

References Cited

UNITED STATES PATENTS

| | | | |
|---|---|---|---|
| 2,079,485 | 5/1937 | Bousman | 324—110 |
| 2,584,800 | 2/1952 | Grisdale | 317—16 |
| 3,223,937 | 12/1965 | McDonald. | |
| 3,361,967 | 2/1968 | Noveske | 324—106 |
| 3,153,152 | 10/1964 | Hoffman | 330—26 X |

FOREIGN PATENTS

| | | | |
|---|---|---|---|
| 149,629 | 1962 | U.S.S.R. | |

J. D. TRAMMELL, Primary Examiner

W. H. BEHA, Jr., Assistant Examiner

U.S. Cl. X.R.

317—16; 324—106, 110